(12) United States Patent
Gudorf

(10) Patent No.: US 6,313,887 B1
(45) Date of Patent: Nov. 6, 2001

(54) TELEVISION REMOTE COMMANDER WITH DATA RECEPTION CAPABILITY

(75) Inventor: Gregory D. Gudorf, Mahwah, NJ (US)

(73) Assignees: Sony Corporation (JP); Sony Electronics, NJ (US)

( * ) Notice: Subject to any disclaimer, the term of this patent is extended or adjusted under 35 U.S.C. 154(b) by 0 days.

(21) Appl. No.: 09/038,238

(22) Filed: Mar. 11, 1998

(51) Int. Cl.[7] .................................................. H04N 5/445
(52) U.S. Cl. ............................ 348/734; 348/563; 348/552
(58) Field of Search ........................ 340/825.26, 825.27, 340/825.44, 311.1; 348/734, 553, 725, 554, 906, 563, 552; 455/5.1; H04N 5/445, 5/44

(56) References Cited

U.S. PATENT DOCUMENTS

| | | | |
|---|---|---|---|
| 5,274,454 | * 12/1993 | Higgins, Jr. ........................... | 348/724 |
| 5,410,326 | * 4/1995 | Goldstein ............................. | 348/734 |
| 5,543,781 | * 8/1996 | Ganucheau, Jr. et al. ...... | 340/825.26 |
| 5,710,605 | * 1/1998 | Nelson .................................. | 348/906 |
| 5,812,931 | * 9/1998 | Yuen ..................................... | 455/5.1 |
| 5,838,252 | * 11/1998 | Kikinis ................................. | 340/311.1 |
| 5,877,699 | * 3/1999 | Sharpe et al. ................... | 340/825.44 |
| 5,926,108 | * 7/1999 | Wicks et al. ..................... | 340/825.44 |
| 6,052,556 | * 4/2000 | Sampsell .............................. | 455/6.2 |

FOREIGN PATENT DOCUMENTS

| | | | |
|---|---|---|---|
| 0426966 | * 5/1991 | (EP) . | |
| 10-210380 | * 8/1998 | (JP) | H04N 5/445 |

* cited by examiner

*Primary Examiner*—David E. Harvey
(74) *Attorney, Agent, or Firm*—Ronald P. Kananen; Rader, Fishman & Grauer, PLLC

(57) ABSTRACT

A novel television remote control unit receives transmissions from a paging system and incorporates a display device to provide data delivery to television viewers. Data may be gather for dissemination by a service provider from any public or proprietary source, preferably including the Internet. The receiver may also be incorporated into a television set and provide a display of received data on the display device of the television set.

15 Claims, 4 Drawing Sheets

TELEVISION REMOTE COMMANDER WITH DATA RECEPTION CAPABILITY

FIELD OF THE INVENTION

The present invention relates generally to the fields of television remote control devices and wireless pagers. More particularly, the present invention relates to an application of wireless pager technology as a means of delivering data directly a television remote control unit.

BACKGROUND OF THE INVENTION

Modern television programming is extremely popular. It is a communication medium that reaches billions of people all around the world every day. The average person spends several hours each day watching television for entertainment or for information.

Television watching is made easier and more enjoyable by the use of a remote control unit which allows the viewer to change channels, adjust the volume, or control other features of the television at a distance. Typically, remote control units send infra-red and/or radio frequency signals to a receiver on the television set. The receiver decodes the signals and implements the instructions conveyed by the signals.

Recently, developments have been announced to increase the capacity of the television as a medium for conveying information. For example, some recent products provide a computer processor and a connection over a standard phone line between the television and the Internet or other data source. With such a connection, the television screen can be used as a computer monitor while the viewer surfs the Internet or other data source for informational content. The viewer may also use the television and Internet to correspond with others via e-mail.

While useful, this system of delivering informational content to the viewer's television is relatively difficult to implement. The expense of a computer processor in the television or connected thereto must be incurred. Additionally computer peripherals such as a keyboard or other input device may be required.

Moreover, the connection between the television and the Internet requires use of the household phone line, excluding other income calls, or requires the expense of a second, dedicated phone line. Once the connection to the Internet is established, the Internet service provider will likely charge an additional monthly fee for Internet access.

Accordingly, there is a need in the art for a method and an apparatus that more easily and inexpensively makes the informational content of such databases as the Internet readily available to television viewers who are watching television.

SUMMARY OF THE INVENTION

It is an object of the present invention to meet the above identified needs and others. More particularly, it is an object of the present invention to provide a method of using a paging system in connection with a television remote control unit or the television unit itself to provide information to the television viewer.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects, the present invention may be embodied in a television remote control unit having a keypad for receiving user input, a signal generator for generating and transmitting a signal to a television set in response to the user input, a display, an antenna for receiving transmissions from a paging system, and a processor for decoding the transmissions and displaying information contained in the transmissions on the display. Preferably the remote control also has an alert device for alerting the user when one of the transmissions is received.

In an alternative embodiment, the present invention may be implemented in a television set having a display device (e.g. a cathode ray tube, a liquid crystal display, or a plasma addressed liquid crystal display, etc.), an antenna for receiving transmissions from a paging system, and a processor for decoding the transmissions and displaying information contained in the transmissions on the display device. The television may also have an alert device for alerting the user when one of the transmissions is received.

In support of the novel remote control unit or novel television set described above, the present invention includes a paging system having a system of base stations for sending the transmissions; and a service provider for gathering the information to be included in the transmissions for dissemination to television viewers. Preferably, the paging system includes a connection between the service provider and the Internet or other data source through which the service provider gathers the information to be disseminated.

Additionally, the processor in either the television set or the remote control unit described above may drive the antenna to which it is connected to signal the paging system. Where this is the case, the service provider can identify the base station in the paging system which best receives the signal from the antenna and can screen the information gathered for information relevant to the location of the identified base station.

The present invention also encompasses a method of delivering information to television viewers comprising the steps of: providing a television remote control unit having a keypad for receiving user input and a signal generator for generating and transmitting a signal to a television set in response to the user input, receiving transmissions from a paging system with an antenna of the remote control unit, decoding the transmission with a processor of the remote control unit, and displaying information contained in the transmission on a display of the remote control unit. The method may also include alerting the user when one of the transmissions is received with an alert device.

Alternatively, if it is desired that the invention be embodied in a television set, the method of the invention may include the steps of providing a television set having an antenna and a display device tube, receiving transmissions from a paging system with the antenna, decoding the transmission with a processor of the television set, and displaying information contained in the transmission on the display device.

Irrespective of whether a remote control unit or the television unit itself is used to receive the information transmissions, the method of the present invention may further include: sending the informational transmissions with a system of base stations of the paging system; and gathering the information to be included in the transmissions. Preferably, the gathering of information includes gathering information from the Internet.

If the television set or remote control unit have the capacity to signal to the paging system, the method of the present invention may include the steps of driving the antenna with the processor to signal the paging system. Consequently, the paging system can execute the steps of receiving the signal from the antenna with the system of base stations; gathering the information to be included in the transmissions; identifying the base station which best receives the signal from the antenna; and screening the information for information relevant to the location of the base station which best receives the signal from the antenna. The method may further include enabling two-way interaction between the user and the service or data source;

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained.

Figure 1:
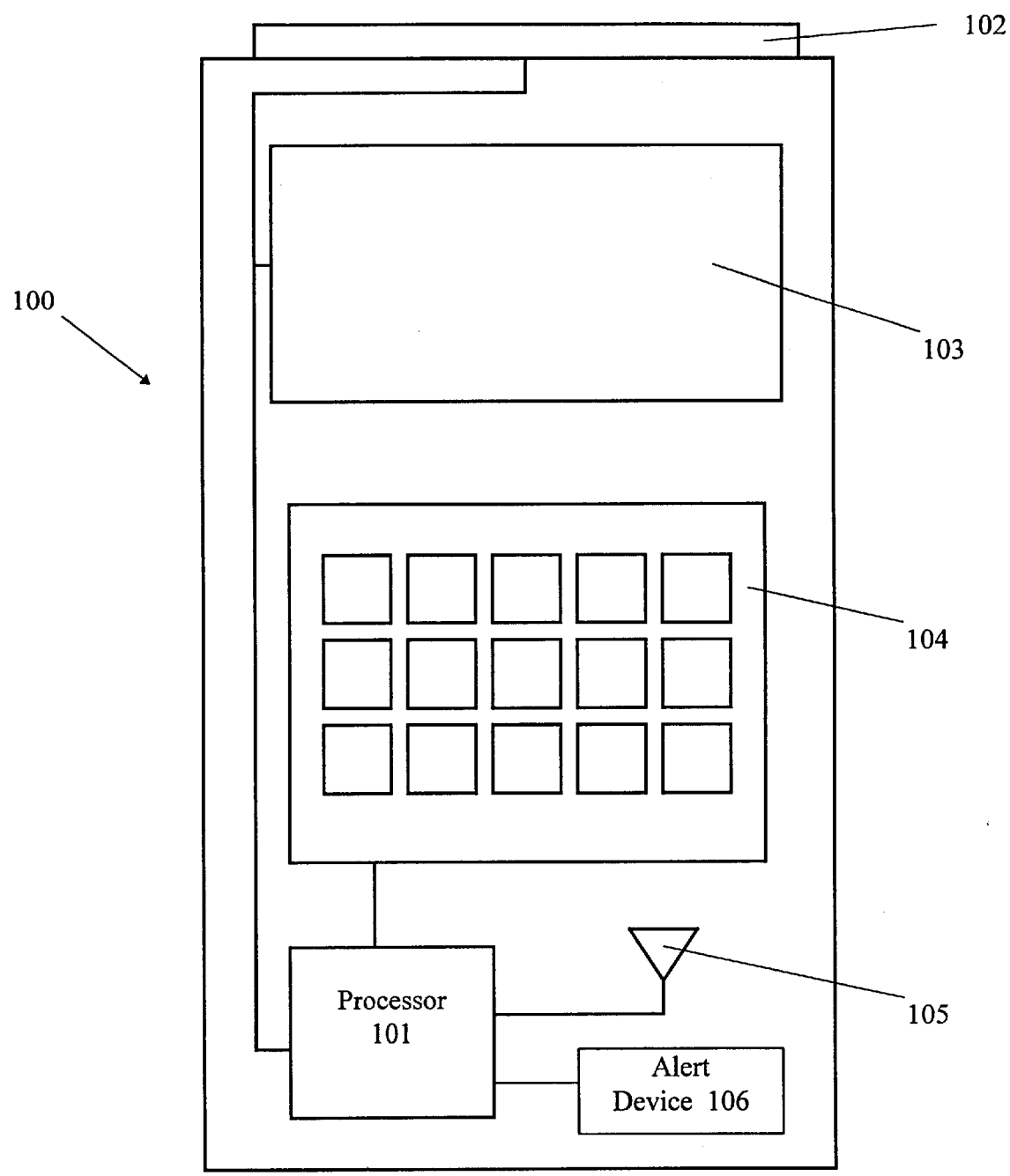
FIG. 1 is an illustration of a television remote control unit according to the present invention.

FIG. 1 illustrates a television remote control unit 100 according to the present invention. As shown in FIG. 1, the remote control 100 includes a keypad 104 through which the user can input a signal to change the channel on the television, adjust the television volume or control other features of the television.

Signals generated by the user input to the keypad 104 are provided to a processor 101. In response, the processor 101 drives for example, an infra-red or radio frequency signal generator 102 which generates an infrared or radio frequency signal which is transmitted to the television set (not shown) to convey the viewer's input to the television.

In addition, the remote control unit 100 has a display device 103, for example, a liquid crystal display; an antenna 105; and an alert device 106. The antenna 105 is provided to receive transmissions, for example radio-frequency transmissions, from a pager system (See FIG. 2).

The transmission received from the pager system is provided through the antenna 105 to the processor 101. The processor 101 decodes the transmission and drives the display 103 to display the alpha-numeric or graphic data contained in the transmission.

The alert device 106 could be, for example, a speaker that emits an audio alert, a light that emits a visible alert, a vibrator that emits a vibratory alert, or a remote signal generator which signals a television to enable the television to display a visible alert. The alert device 106 is driven by the processor 101 in response to the reception of a transmission via the antenna 105. The alert device 106 thus signals the television viewer that a transmission has been received and can be viewed on the display 103. Accordingly, the alert device 106 may be any device which, in response to the processor, alerts the television viewer that a transmission has been received.

The remote control device 100 of the present invention thus allows the television viewer to receive informational transmissions while viewing television. The informational content of the transmissions may be, but is not limited to, weather information or alerts, traffic information, emergency bulletins, news headlines, television program announcements, advertising, sports scores, financial data and market updates.

Figure 2:
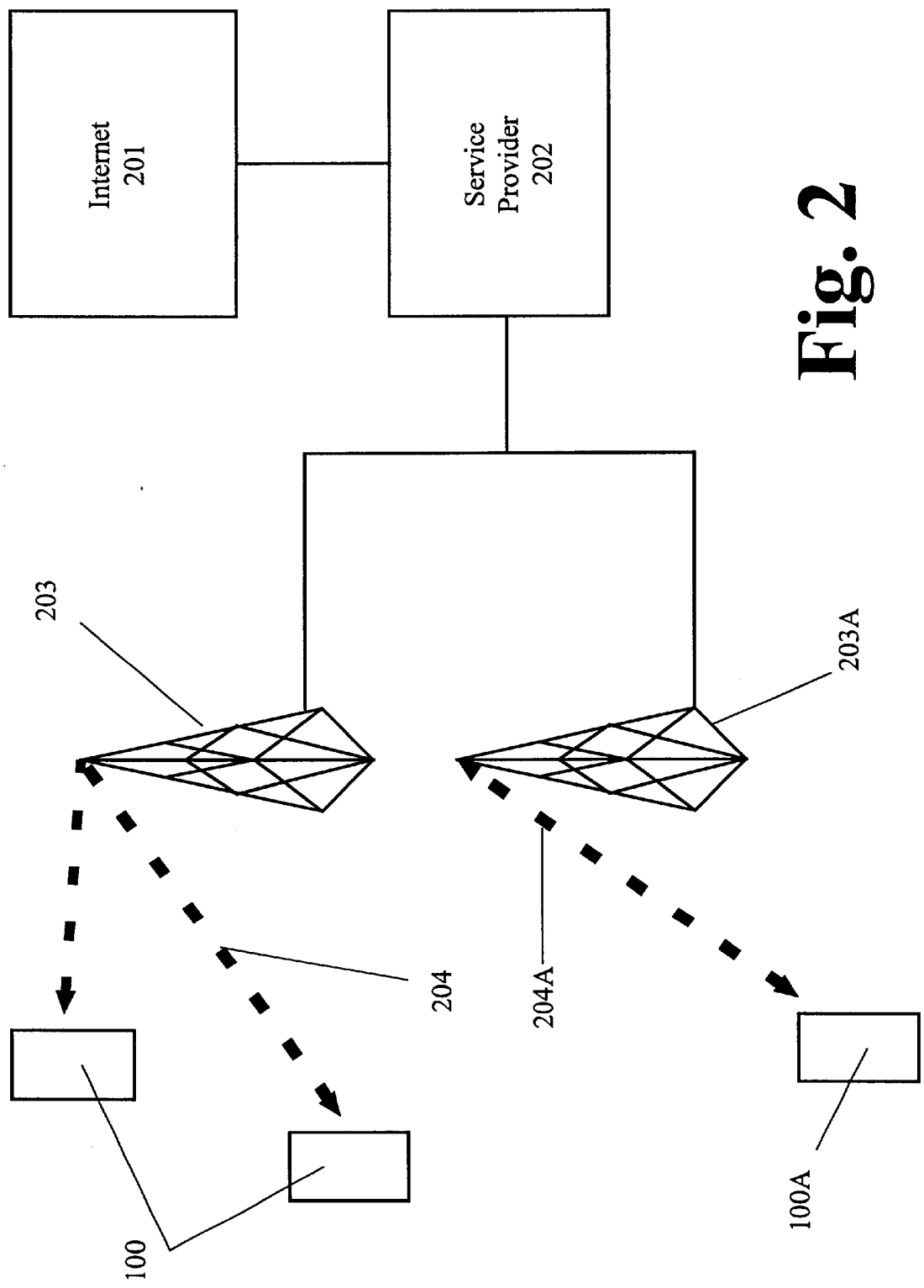
FIG. 2 is an illustration of an information distribution network according to the present invention and involving the remote control units of FIG. 1.

Turning to FIG. 2, the pager system of the present invention may include a system of base stations 203 which are deployed throughout a service area to transmit data 204 to the remote control units 100. The system of base stations 203 are connected to a service provider 202. The service provider 202 will gather the information to be broadcast to the remote control units 100.

The service provider 202 may gather data to be transmitted to television viewers from any public or proprietary source. Preferably, the service provider 202 will have a connection to the Internet 201 and can therefore use the extremely cost-effective and wide-ranging information gathering capabilities of the Internet to provide information to television viewers.

When television viewers subscribe to the data delivery service of the provider 202, the viewers may provide the service provider 202 with a profile which details the type of information a viewer wishes to receive. For example, a particular viewer may request regular updates on the price of a particular stock or commodity. Another viewer, may request the scores from sporting events of a particular team or league.

Additionally, the remote control unit 100A may have a processor 101 which not only receives transmissions, but also makes transmissions 204A with the antenna 105 to the nearest base station 203A. In this way, the paging system can determine the rough location of the remote control unit 100A by determining the location of the base station 203A receiving a transmission from the unit 100A. If more than one base station is receiving the signal from the unit 100A, the station that receives the strongest signal, i.e., that best receives the signal from the remote control unit 100A, will be considered the base station best representing the remote control unit's 100A geographic location.

The service provider may then screen information being transmitted so that the information is relevant to the particular location where the viewer's remote control has been determined to be, or may reduce power requirements by only transmitting to the remote control unit 100A from the base station 203A.

Alternatively, the viewer may use the remote control 101A to transmit data to the paging system 203A. Such user input may allow the user to regulate the flow of information to the user's remote control unit 100A or interact with the service provider.

Figure 3:
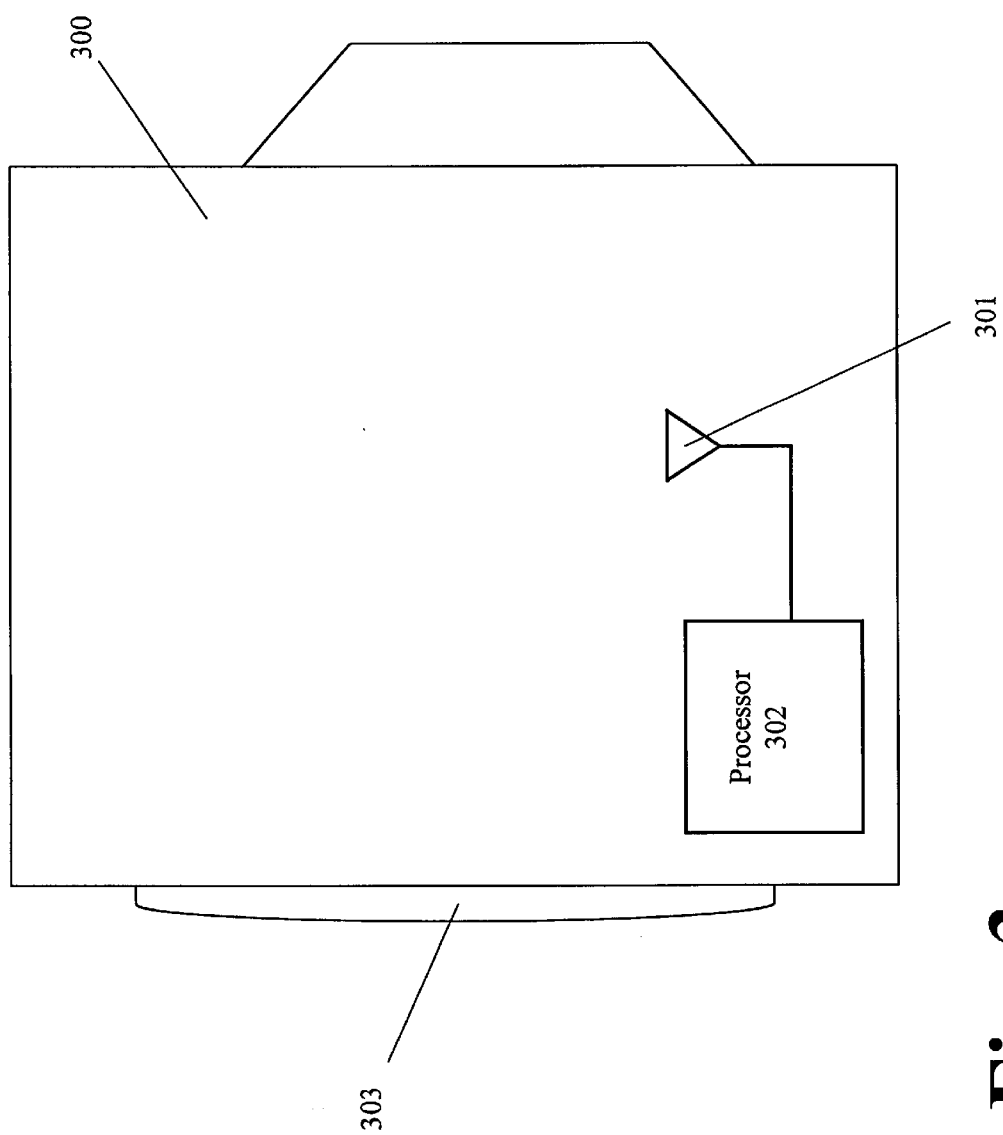
FIG. 3 is an illustration of a television set according to the present invention.

FIG. 3 illustrates an alternative embodiment of the present invention. As shown in FIG. 3, a processor 302 and an antenna 301 are provided as part of the a television set 300. The processor 302 and antenna may be built into the television set 300 or provided in a separate, attaching unit.

In the embodiment of FIG. 3, when an informational transmission is received by the processor 302 via antenna 301, the processor 302 connects to the display device 303 of the television set 300 in order to display the content of the transmission where it can be seen by the viewer. The display device 303 is, for example, a cathode ray tube, a liquid crystal display, a plasma addressed liquid crystal display or any other image display device which might be used in a television. Although less necessary in this embodiment, the television set 300 may also emit a video or audio alert signal to indicate that an informational transmission is being displayed.

Figure 4:
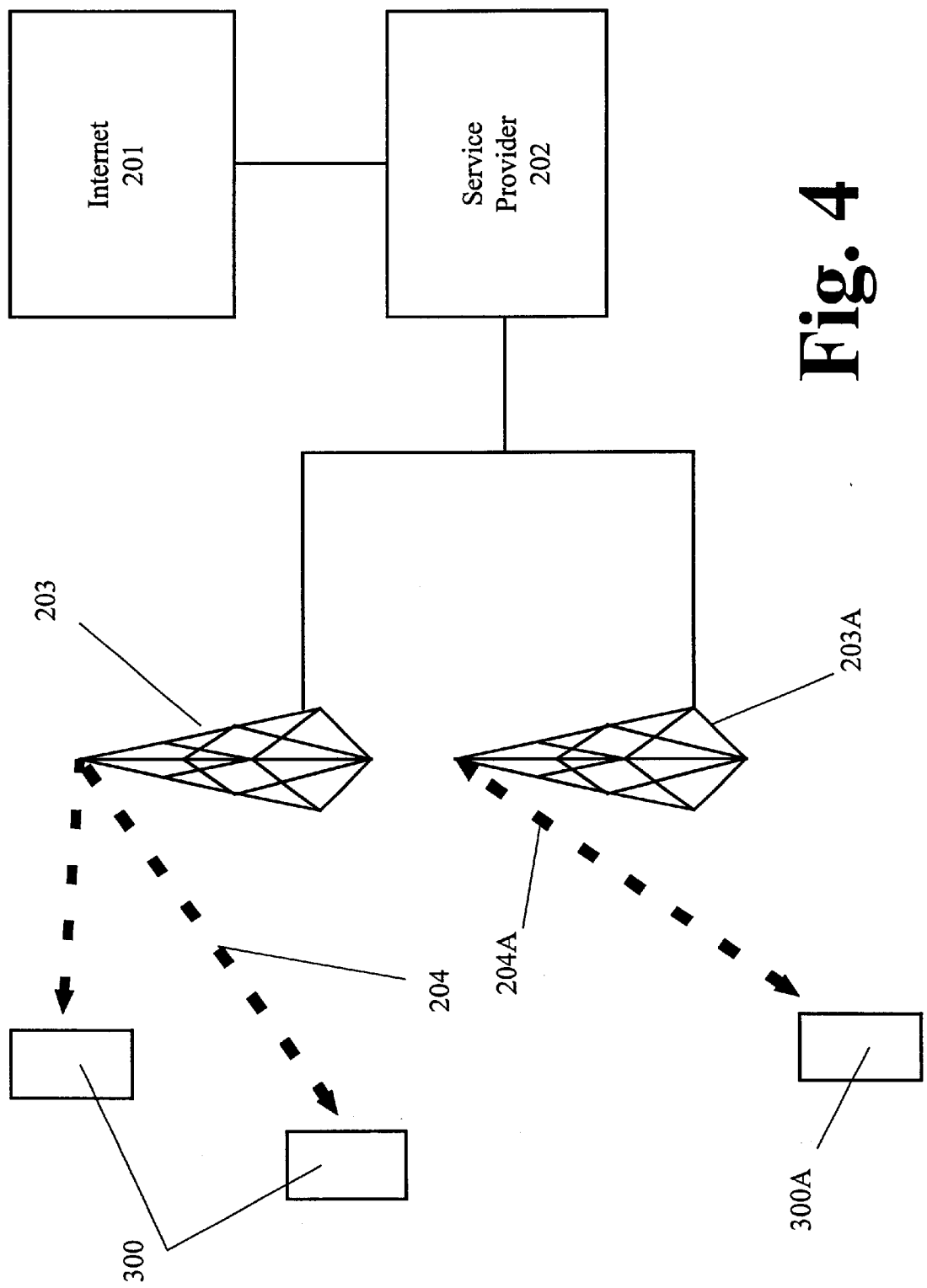
FIG. 4 is an illustration of an information distribution network according to the present invention and involving the television sets of FIG. 1.

FIG. 4 illustrates that the processor 302 of the television set 300A may be designed to transmit a signal 204A to the nearest base station 203A. In this way, as before, the service provider 202 may screen informational broadcasts so that information relevant to the viewer's location is transmitted to the viewer's television 300A, or the viewer may be enabled to interact with the service provider or regulate the flow in information from the service provider.

The preceding description has been presented only to illustrate and describe the invention. It is not intended to be exhaustive or to limit the invention to any precise form disclosed. Many modifications and variations are possible in light of the above teaching.

The preferred embodiment was chosen and prescribed in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A television remote control comprising:
   a keypad for receiving user input;
   a signal generator for generating and transmitting a signal to a television set in response to said user input;
   a display;
   an antenna for receiving transmissions from a paging system;
   a processor for decoding said transmissions and displaying information contained in said transmissions on said display; and
   a service provider for gathering said information to be included in said transmissions;
   wherein said processor drives said antenna to signal said paging system to request or discontinue said transmissions from said paging system.

2. A remote control as claimed in claim 1, further comprising an alert device for alerting said user when one of said transmissions is received.

3. A paging system as claimed in claim 1, further comprising a connection between said service provider and the Internet through which said service provider gathers said information.

4. A television remote control comprising:
   a keypad for receiving user input;
   a signal generator for generating and transmitting a signal to a television set in response to said user input;
   a display;
   an antenna for receiving transmissions from a paging system;
   a processor for decoding said transmissions and displaying information contained in said transmissions on said display, wherein said processor also drives said antenna to signal said paging system;
   a plurality of base stations for sending said transmissions and receiving a signal from said antenna; and
   a service provider for gathering said information to be included in said transmissions,
   wherein said service provider identifies one of said base stations which best receives said signal from said antenna and screens said information for information relevant to a location of said base station which best receives said signal from said antenna.

5. A television set comprising:
   a display device;
   an antenna for receiving transmissions from a paging system; and
   a processor for decoding said transmissions and displaying information contained in said transmissions on said display device, wherein said processor also drives said antenna to signal said paging system;
   a plurality of base stations for sending said transmissions and receiving a signal from said antenna; and
   a service provider for gathering said information to be included in said transmissions,
   wherein said service provider identifies one of said base stations which best receives said signal from said antenna and screens said information for information relevant to a location of said base station which best receives said signal from said antenna.

6. A television set as claimed in claim 5, further comprising an alert device for alerting said user when one of said transmissions is received.

7. A paging system as claimed in claim 5, further comprising a connection between said service provider and the Internet through which said service provider gathers said information.

8. A method of delivering information to television viewers comprising:
   providing a television remote control unit having a keypad for receiving user input and a signal generator for generating and transmitting a signal to a television set in response to said user input;
   receiving transmissions from a paging system with an antenna of said remote control unit;
   decoding said transmission with a processor of said remote control unit;
   displaying information contained in said transmission on a display of said remote control unit; and
   driving said antenna with said processor to signal said paging system to request or discontinue said transmissions.

9. A method as claimed in claim 8, further comprising alerting said user when one of said transmissions is received with an alert device.

10. A method as claimed in claim 8, further comprising:
    sending said transmissions with a plurality of base stations; and
    gathering said information to be included in said transmissions.

11. A method as claimed in claim 10, wherein said gathering further comprises gathering information from the Internet.

12. A method of distributing information over a paging network through a paging unit located in the remote control unit of a television set, wherein the remote control unit comprises a keypad for receiving user input, an antenna for receiving transmissions from and making transmissions to a paging system, and a processor for decoding said transmissions and displaying information contained in said transmissions on a display, the method comprising:
    determining which of a plurality of base stations of said paging system for communicating with said remote control unit best receives a signal from said antenna;
    screening information gathered by a service provider for information relevant to a location of said base station which best receives said signal from said antenna; and transmitting said relevant information to said remote control unit.

13. A method of distributing information over a paging network through a paging unit located in a television set, wherein the paging unit comprises an antenna for receiving transmissions from and making transmissions to a paging system, and a processor for decoding said transmissions and displaying information contained in said transmissions on a screen of said television set, the method comprising:

determining which of a plurality of base stations of said paging system for communicating with said remote control unit best receives a signal from said antenna;

screening information gathered by a service provider for information relevant to a location of said base station which best receives said signal from said antenna; and transmitting said relevant information to said remote control unit.

14. A method as claimed in claim 13, further comprising alerting a user when one of said transmissions is received.

15. A method as claimed in claim 13, further comprising gathering said information from the Internet.

* * * * *